Jan. 1, 1952 J. M. LESTER ET AL 2,581,194

RADIO TUNING SYSTEM

Filed June 16, 1948 3 Sheets-Sheet 1

INVENTORS
JOHN M. LESTER AND
RALPH L. THOMPSON
BY Fred'k Schmetz
ATTORNEY.

INVENTORS
JOHN M. LESTER AND
RALPH L. THOMPSON
BY Fred'k T. Schuetz
ATTORNEY.

INVENTORS
JOHN M. LESTER AND
RALPH L. THOMPSON
BY
Fred [signature]
ATTORNEY

Patented Jan. 1, 1952 2,581,194

UNITED STATES PATENT OFFICE 2,581,194

RADIO TUNING SYSTEM

John M. Lester, Hempstead, and Ralph L. Thompson, Mineola, N. Y.

Application June 16, 1948, Serial No. 33,284

4 Claims. (Cl. 250—20)

The invention relates to radio tuning circuits for the reception and detection of electromagnetic waves, for example, a superheterodyne receiver circuit adapted for use in electronic systems such as are embodied in television receiver units and frequency-modulation receiver units.

In a television receiver unit, for example, the practice of utilizing an oscillator tube common to a plurality of differently tuned circuits selectively switched thereto for channel selection introduces complications in the switching mechanism since the radio frequency currents must pass through said mechanism. In addition, the inherent capacity and inductance of the switching mechanism renders the initial tuning problem more difficult.

The present invention has for an object to provide a plurality of independent tuning elements or units of predetermined characteristics, together with means to introduce the same selectively in a reception and detection circuit between the radio frequency amplifier and the output circuit portions thereof; also, in the case of a superheterodyne receiver circuit to provide each tuning circuit with its own oscillator circuit including a, preferably, subminiature oscillator tube and associated condensers, resistors and inductances to afford a complete and independent local oscillator circuit for a particular channel.

Another object of the invention is to provide switching means for selectively connecting in the reception and detection circuit the required pretuned unit with its radio frequency receiver circuit or a receiver circuit and the particular oscillator circuit unit corresponding to the desired channel.

Still another object of the invention is to provide these receiver-oscillator circuit units in the nature of a simple panel element adapted for convenient introduction into the reception and detection circuit, for example, in being separable from the receiver apparatus as through a plug and socket connection therewith, which enables ready and convenient replacement of a pretuned receiver-oscillator circuit unit in case of failure or if a channel substitution should be required.

A further object of the invention is to provide a receiver-oscillator circuit unit which will admit of the use of an oscillator tube that is not required to respond to a wide range of frequencies but only to the particular fixed frequency of one selected channel, no adjustment than being required in a unit when installed in the reception and detection circuit.

A still further object of the invention is to make it possible to reduce the total number of tuned receiver-oscillator circuit units of a reception and detection circuit, particularly in the case of television receivers, to those channels only which are effective in the particular locality in which the novel receiver apparatus is to be used, resulting in an appreciable saving in the cost of production of such apparatus since at most some five of a total of thirteen channels, now assigned, would ordinarily be required.

In carrying out the invention, there is substituted in the customary circuit for the reception and detection of electromagnetic waves, for example, a superheterodyne receiver circuit of a television receiver or of a receiver for frequency modulated electromagnetic waves, a plurality of replaceable panel elements having coupled circuits tuned to a predetermined frequency.

These panels are designed to replace the customary tunable circuit portion between the input radio frequency amplifier and the output or mixer circuit of the receiver apparatus, which tuning circuit includes generally a broadly responsive oscillator tube and the tuning means associated with a radio frequency coil and with the said tube.

The novel arrangement thus contemplates the selective connection, in a reception and detection circuit, to the output of its radio frequency amplifier, which is to be of broad reception characteristics, of a tuning element including two pretuned and suitably coupled circuits, one comprising, for example, a pretuned radio frequency receiver circuit including a fixed inductance and condensers and coupled to the other circuit which includes an oscillator tube with condensers, resistors and a fixed inductance to afford a pretuned oscillator circuit.

It will be understood that the novel tuning elements will be provided in number corresponding to the channels over which signals are to be received, provision being made for the ready introduction of a pretuned channel element in the reception and detection circuit. For example, all of the elements may be plugged into corresponding socket groups provided in the receiver apparatus and switching means may be provided to introduce selectively a desired pretuned element; or, the arangement may be such that only the element tuned to the desired channel may be plugged into a single group of suitable sockets or the like, the remaining elements in the meantime being conveniently stored for subsequent use when desired, which is effected by merely replacing the one no longer desired in said group of sockets.

The nature of the invention, however, will best be understood when described in connection with the accompanying drawings, in which.

Figure 1:
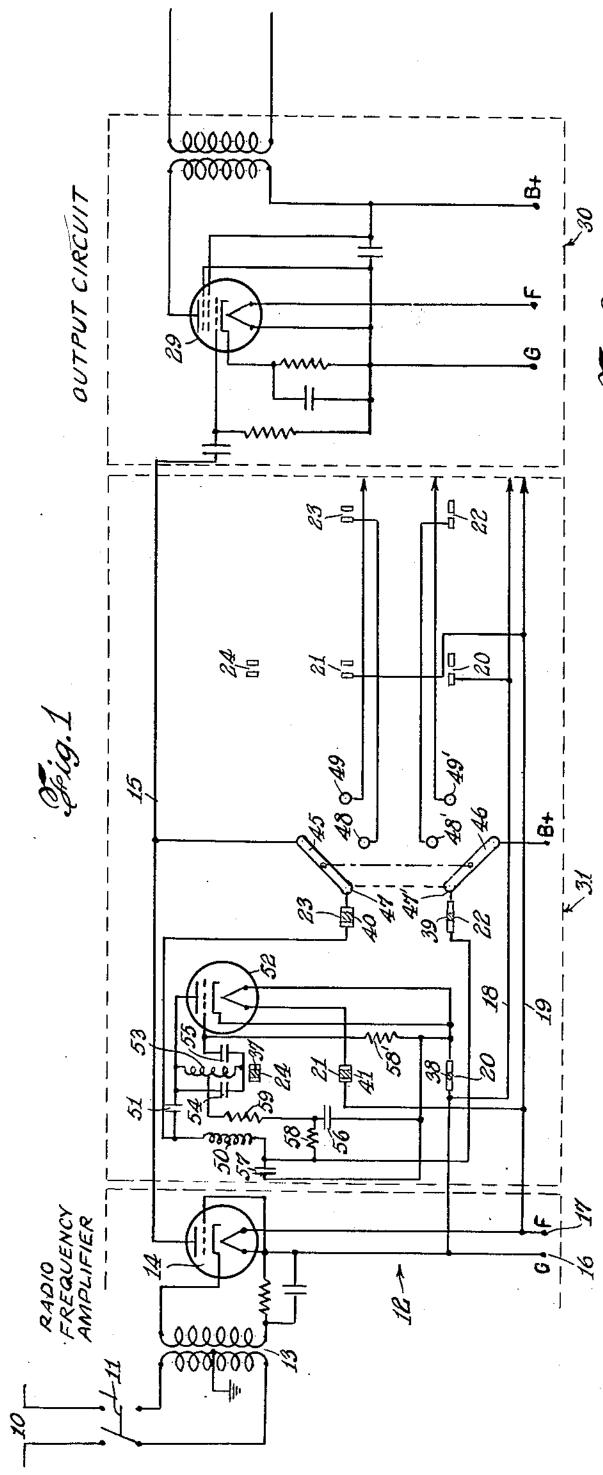
Fig. 1 is a wiring diagram of a portion of a superheterodyne receiver circuit as modified in accordance with the invention, and illustrates one means of introducing a desired pretuned tuning element therein.
Figure 3:
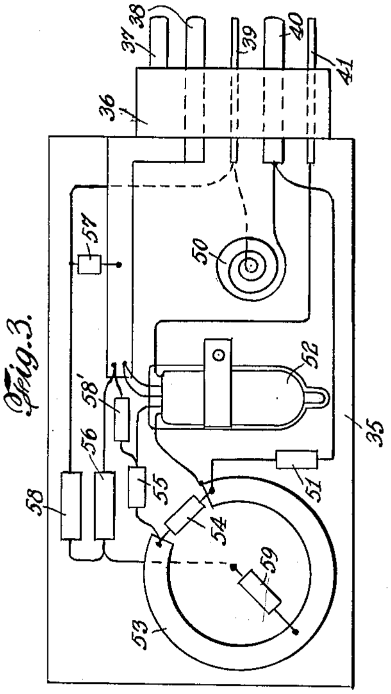
Fig. 3 is an elevational view, on an enlarged scale, of one of the novel pretuned panel elements utilized with the receiver apparatus.
Figure 2:
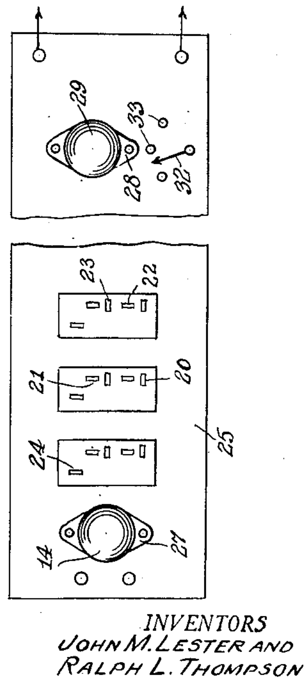
Fig. 2 is a fragmentary plan view illustrating receiver apparatus adapted for operation in the novel manner.

Referring to the drawings, more particularly Figs. 1 to 3 thereof, 10 designates a receiving antenna such as of the di-pole type for receiving electromagnetic waves of relatively high frequency. This antenna is adapted for connection, as through the switch 11, to an input radio frequency amplifier indicated at 12, of broad reception characteristics, including a transformer 13 to the primary of which the antenna is adapted to be connected through operation of the switch 11. The output of the transformer is connected to an amplifier tube 14 and a lead 15 extends from its plate, while its filament is connected to terminals 16 and 17 respectively affording ground and power connections.

Further leads 18 and 19 connect the respective ground and power connections of the said filament to respective sockets 20 and 21 of each of one or more groups of sockets, each group including additional sockets 22, 23 and 24, all located, for example, in the top or front wall of a suitable housing or support 25, Fig. 2, for the reception apparatus as a whole. This top accommodates also, as in a socket 27, the tube 14 as well as through a tube socket 28 a tube 29, in the particular embodiment of the invention shown by way of example, of an output or mixer circuit indicated at 30, the entire reception and detection circuit shown being of the superheterodyne type and the output of the said mixer circuit thereof being designed, for example, for television use. No claim is made to the particular type of output circuit to which the novel tuning circuit arrangement utilized is applied, said tuning circuit being indicated at 31 as introduced intermediate the amplifier circuit 12 and output or mixer circuit 30.

On the said top or face of the housing 25 may be provided, also, suitable manually operable selector means such as the pointer 32 movable to a plurality of points 33 designating different channels which are to be introduced thereby into the tuning portion of the apparatus, as will hereinafter be more fully set forth. The pretuned circuits of corresponding channels thus to be introduced may conveniently be assembled as a unit on a panel member 35, for example, this panel being provided at one end with a contact-prong block 36 from which extend a series of prongs 37, 38, 39, 40, and 41.

Of the various prongs, the prong 37 serves merely as a locating prong to fit the socket 24 to position properly the panel to the housing 25; the prong 38, to fit the grounding socket 20; the prong 39, to fit the socket 22 which is adapted to be connected to the positive side of a source of B potential; the prong 40, to fit the socket 23 which is adapted to be connected to the lead 15 and the mixer circuit 30; and the prong 41, to fit the socket 21 which is connected to the filament power source.

In the particular embodiment of the invention shown in Figs. 1 and 2, the said top or face of the housing 25 is indicated as provided with a plurality of the grouped panel-receiving sockets or blocks and each group is designed to receive the prongs of a panel bearing the desired channel or pretuned circuits. However, none becomes introduced electrically, except as to the filament and ground connections, between the amplifier circuit 12 and the mixer circuit 30 until the indicator arm 32 is moved to the particular one of the points 33 corresponding to that channel. If desired, of course, only the filament of the active introduced circuit may be energized, but this would necessitate the provision of an additional bank of contacts. The said indicator arm in being adjusted to the desired channel position moves jointly two contact-making arms 45 and 46 which are adapted to pass over respective sets of contacts 47—47', 48—48', 49—49', etc.

As indicated in Fig. 1, the said arms 45, 46 are in the first position, that is to say, on the respective contacts 47 and 47', and the first of the series of panels is thereby introduced into the reception and detection circuit—the prongs of this panel being indicated in cross-section. By this expedient, a pretuned circuit becomes an integral part of the apparatus, and if it be desired to change to a different channel, it is necessary merely to locate the indicator arm 32 accordingly; or, pushbutton or like mechanism (not shown) may be provided to effect the change.

In the embodiment illustrated in Figs. 1 to 3, inclusive, the particular type of pretuned circuit arrangement of a panel member is of a nature including two pretuned circuits—one a pretuned radio frequency receiver circuit including the fixed inductance 50 and a condenser 51, said receiver circuit being coupled to the other or self-contained oscillator circuit which may include the oscillator tube 52 or crystal oscillator (not shown), a fixed inductance 53, the condensers 54, 55, 56 and 57, and resistors 58, 58' and 59.

Figure 4:
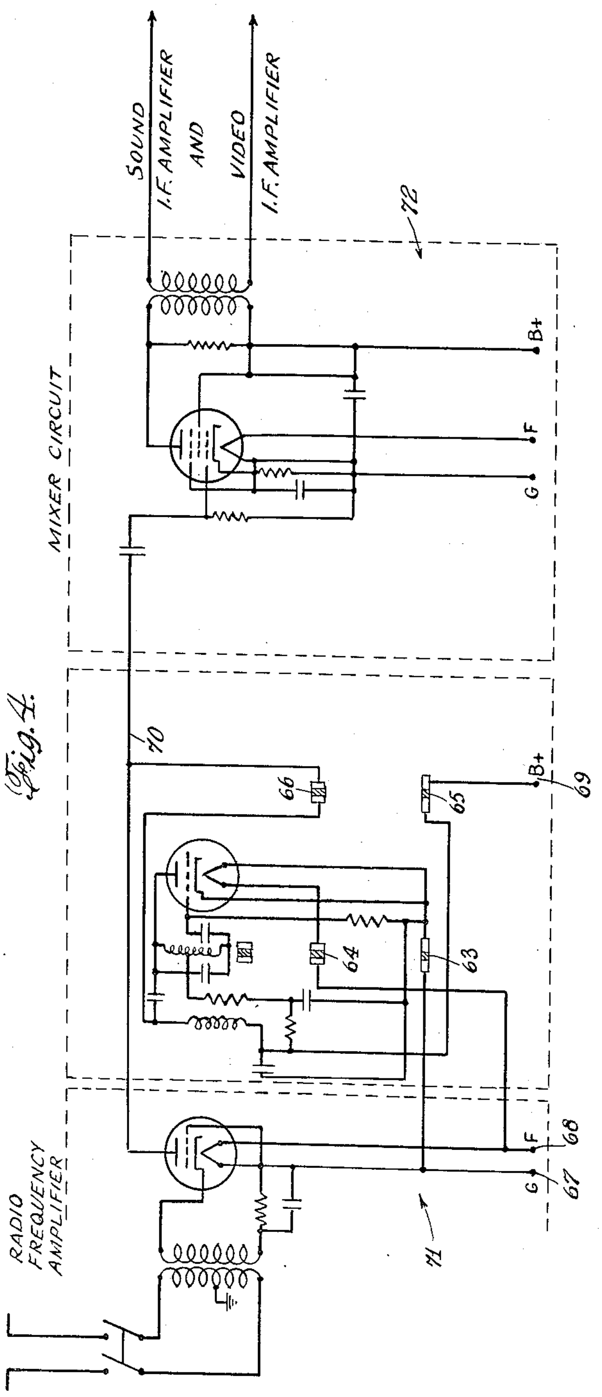
Fig. 4 is a wiring diagram similar to that shown in Fig. 1.
Figure 5:
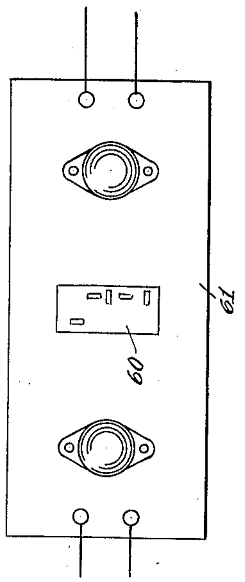
Fig. 5 is a plan view similar to that of Fig. 2 and illustrate a modification in the manner of introducing the pretuned elements in the reception and detection circuit.

A modified form of the pretuned circuits panel arrangement is indicated in Figs. 4 and 5 of the drawings, wherein but a single and like panel receiving group of five sockets 60 is provided in the housing 61 and is adapted to accommodate but a single panel unit at a time, viz: that corresponding to the required channel, other panels bearing circuits tuned to different channels being manually substituted, as desired. No switch selector mechanism will thus be required; and the sockets 63, 64, 65 and 66 are permanently connected then respectively to the ground tereminal 67, the filament power terminal 68, the positive side of a source 69 of B potential, and the lead 70 from the amplifier tube of the radio frequency amplifier 71 as well as to the mixer circuit 72, the panel selected being included in circuit between said amplifier 71 and the mixer circuit 72.

Figure 6:
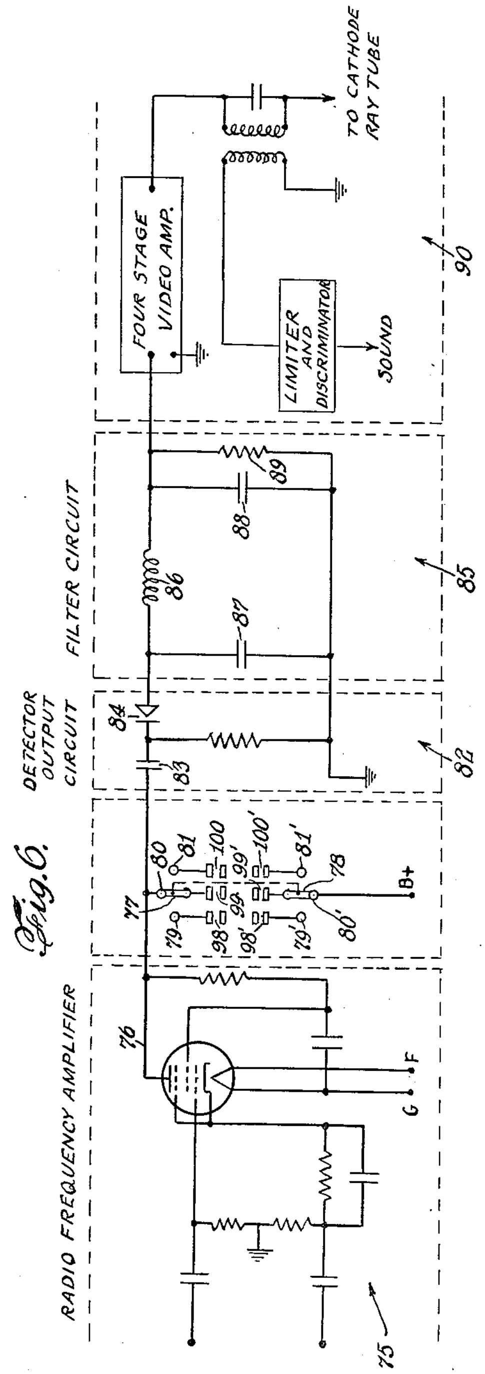
Fig. 6 is a part wiring and part block diagram illustrating a further modification in the novel pretuned panel element reception and detection arrangement.
Figure 7:
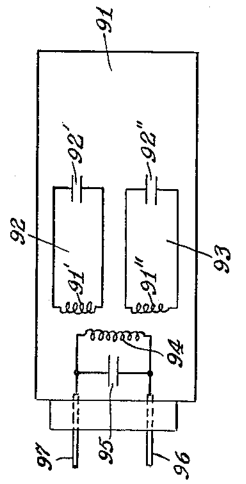
Fig. 7 is an elevational view, on an enlarged scale, of the type of panel elements utilized therein.

When the reception and detection circuit is not of the superheterodyne type, no oscillator pretuned panel member will be required. Thus, reference being had to Figs. 6 and 7, the radio frequency amplifier 75 will have its plate lead 76 connected to the arm 77 of one of a pair of contact arms 77 and 78, the other arm being connected to the positive side of a source of B potential, said arms being movable jointly over paired contacts 79—79', 80—80', and 81—81'. Instead, however, of lead 76 continuing directly for connection to a mixer or output circuit, as in the embodiment illustrated in Figs. 1 and 2, the said lead is connected to a detector output circuit 82 through a condenser 83, said detector circuit including a rectifier 84, which may be of the crystal type. The circuit is then connected to a filter circuit 85 which includes inductance 86 with intermediate condensers 87, 88 and resistance 89. The output of this filter circuit 85 may be utilized for operation of video apparatus indicated at 90.

For tuning purposes, a plurality of tuning members, such as the panel unit 91, are provided in accordance with the number of channels to be selected. The two tuning circuits 92 and 93 of such units are simple radio frequency tuned circuits each comprising inductances 91', 91'' and condensers 92', 92'' respectively. These tuned circuits are coupled by mutual induction, as through an associated coil 94 having its leads bridged by a condenser 95. The terminals of said leads are connected with respective prongs 96 and 97 which are designed to fit paired sockets 98—98', 99—99' and 100—100' connected respectively with the corresponding elements of the paired contacts 79—79', 80—80' and 81—81'. With the panel units thus connected between the radio frequency amplifier 75 and the detector circuit 83, the desired channel is selected conveniently by bringing the contact arms 77—78 into contact with the appropriate pair of the contacts 79—79', 80—80' and 81—81'.

We claim:

1. In receiver apparatus including a circuit for the reception and detection of electromagnetic waves having an input radio frequency amplifier adapted for the reception of incoming signals, and an output circuit; a plurality of manually replaceable and pretuned channel units each bearing respective pretuned circuits, one of said circuits including an independent oscillator member affording the fixed fundamental frequency for the particular channel to be selected by the unit; a housing having a plurality of groups of sockets connected with the respective circuits, and a two-bank switch associated with the housing and comprising a plurality of pairs of contacts respectively connected to predetermined pairs of the groups of sockets, together with a pair of arms movable jointly over paired contacts, one arm having permanent connection with the amplifier and with the output circuit and the other with the positive side of a B source of potential, the switching means when its arms are positioned on a selected pair of the paired contacts being adapted to connect a pretuned channel unit of a particular channel, when introduced, with the circuit for reception and detection of electromagnetic waves.

2. A circuit for the reception and detection of electromagnet waves according to claim 1, wherein the output circuit includes a detector for electromagnetic waves and the output of an introduced pretuned channel unit is connected through a rectifier to the output circuit.

3. A circuit for the reception and detection of electromagnetic waves according to claim 1, wherein each of the pretuned channel units comprises a pretuned circuit system wherein the circuits are coupled by mutual induction.

4. A panel unit for use in a circuit for the reception and detection of electromagnetic waves according to claim 1, wherein each pretuned channel unit comprises an insulation strip and contact prongs extending therefrom, and two pretuned circuits are arranged on the strip and are coupled by mutual induction.

JOHN M. LESTER.
RALPH L. THOMPSON.

REFERENCES CITED

The following references are of record in the file of this patent:

UNITED STATES PATENTS

| Number | Name | Date |
|---|---|---|
| 1,816,461 | Baird | July 28, 1931 |
| 1,938,656 | Drake | Dec. 12, 1933 |
| 2,029,035 | Roberts | Jan. 28, 1936 |
| 2,029,461 | Brush | Feb. 4, 1936 |
| 2,062,379 | Silver | Dec. 1, 1936 |
| 2,150,553 | Koch | Mar. 14, 1939 |
| 2,173,898 | Conron | Sept. 26, 1939 |
| 2,215,775 | Banfield | Sept. 24, 1040 |
| 2,268,619 | Reid | Jan. 6, 1942 |
| 2,296,100 | Foster | Sept. 15, 1942 |
| 2,383,322 | Koch | Aug. 21, 1945 |
| 2,421,676 | Beard | June 3, 1947 |
| 2,440,308 | Storck | Apr. 27, 1948 |